United States Patent
Hardt et al.

(10) Patent No.: US 10,419,286 B2
(45) Date of Patent: Sep. 17, 2019

(54) WIRELESS TRANSMISSION OF NETWORK PARAMETERS

(71) Applicant: ARRIS Enterprises LLC, Suwanee, GA (US)

(72) Inventors: Charles Hardt, Lawrenceville, GA (US); Dmitry Barablin, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/212,407

(22) Filed: Jul. 18, 2016

(65) Prior Publication Data
US 2017/0019752 A1 Jan. 19, 2017

Related U.S. Application Data

(60) Provisional application No. 62/193,441, filed on Jul. 16, 2015.

(51) Int. Cl.
*H04B 7/00* (2006.01)
*H04L 12/24* (2006.01)
*H04W 48/16* (2009.01)
*H04W 4/80* (2018.01)

(52) U.S. Cl.
CPC ........... *H04L 41/0816* (2013.01); *H04W 4/80* (2018.02); *H04W 48/16* (2013.01); *H04L 41/0806* (2013.01)

(58) Field of Classification Search
CPC ........... H04L 41/0806; H04L 41/0816; H04W 4/008; H04W 48/16
See application file for complete search history.

(56) References Cited

U.S. PATENT DOCUMENTS

| 2010/0150065 | A1* | 6/2010 | Kim | ............ H04W 16/14 370/328 |
| 2013/0252547 | A1* | 9/2013 | Cho | ............ H04L 41/0846 455/41.1 |
| 2014/0123232 | A1* | 5/2014 | Kuscher | ............ H04W 12/08 709/228 |

(Continued)

FOREIGN PATENT DOCUMENTS

WO    WO 2007005331    *   1/2007

*Primary Examiner* — Edward F Urban
*Assistant Examiner* — Max Mathew
(74) *Attorney, Agent, or Firm* — Bart A. Perkins

(57) ABSTRACT

Methods, systems, and computer readable media may facilitate pairing of a wireless client with an access point (AP). In embodiments, a wireless device such as a bi-directional remote control unit (e.g., Bluetooth, or RF4CE (radio frequency for consumer electronics)) or other device configured to receive and transmit wireless communications may be used to download network parameters such as a target service set identifier (SSID), WPS PIN/passphrase code, and/or other information from the AP and then use the same wireless device to download the network parameters from the wireless device to a client device. Once this operation is complete, the AP may stream one or more services to the client device. This process may be repeated for each client device within a subscriber premise, thereby allowing the user to retrieve the network parameters once, and use the wireless device to quickly program any/all client devices within the subscriber premise.

20 Claims, 6 Drawing Sheets

(56) References Cited

U.S. PATENT DOCUMENTS

2015/0092764 A1* 4/2015 Hirose ................. H04W 36/14
                                                    370/338
2018/0234158 A1* 8/2018 Moshfeghi ............ H04W 84/00
2018/0338318 A1* 11/2018 Yum ........................ H04J 11/00

* cited by examiner

WIRELESS TRANSMISSION OF NETWORK PARAMETERS

CROSS REFERENCE TO RELATED APPLICATION

This application is a non-provisional application claiming the benefit of U.S. Provisional Application Ser. No. 62/193,441, entitled "Wireless Network Pairing Using Remote Control Unit," which was filed on Jul. 16, 2015, and is incorporated herein by reference in its entirety.

TECHNICAL FIELD

This disclosure relates to the wireless transmission of network parameters.

BACKGROUND

It is common that a station installed or otherwise in use at a subscriber premise might not have a dedicated physical button used for initiating a wireless setup or handshake (e.g., Wi-Fi protected setup (WPS) handshake) between the station and an access point (e.g., wireless modem, router, gateway, wireless extender, etc.). Users are therefore forced to connect the station to a display device (e.g., television, computer, mobile device, etc.) to guide the wireless setup between the station and an access point. For example, without a dedicated button for initiating a wireless setup, a user or installer might be forced to connect a multiple-systems operator (MSO) owned set-top box (STB), for example, to a subscriber owned television in order to facilitate a wireless setup between the STB and an access point. Typically, the user guides the wireless setup through software controls.

Currently, pairing wireless (e.g., Wi-Fi) set-tops with an access point (AP) can be accomplished via several methods. The most common methods employ the Wi-Fi protected setup (WPS) push button operation, or require the user to know the correct personal identification number (PIN)/passphrase code associated with a wireless network or service set. A typical home might employee a plurality of Wi-Fi clients (Wi-Fi enabled set-tops) that are physically deployed all across the home. This makes use of the WPS method cumbersome, as the button press has to be initiated on both the client device and the AP, almost simultaneously. With each client requiring a separate WPS operation, this makes this method impractical at best. The PIN code and passphrase method is problematic as it requires the user to select the correct SSID (service set identifier), and enter a valid PIN or passphrase. While this method might be practical for the installer, it is not the best method for the end user. Therefore, it is desirable to improve upon methods and systems for pairing wireless clients with an AP.

BRIEF DESCRIPTION OF THE DRAWINGS

Like reference numbers and designations in the various drawings indicate like elements.

DETAILED DESCRIPTION

Figure 1:
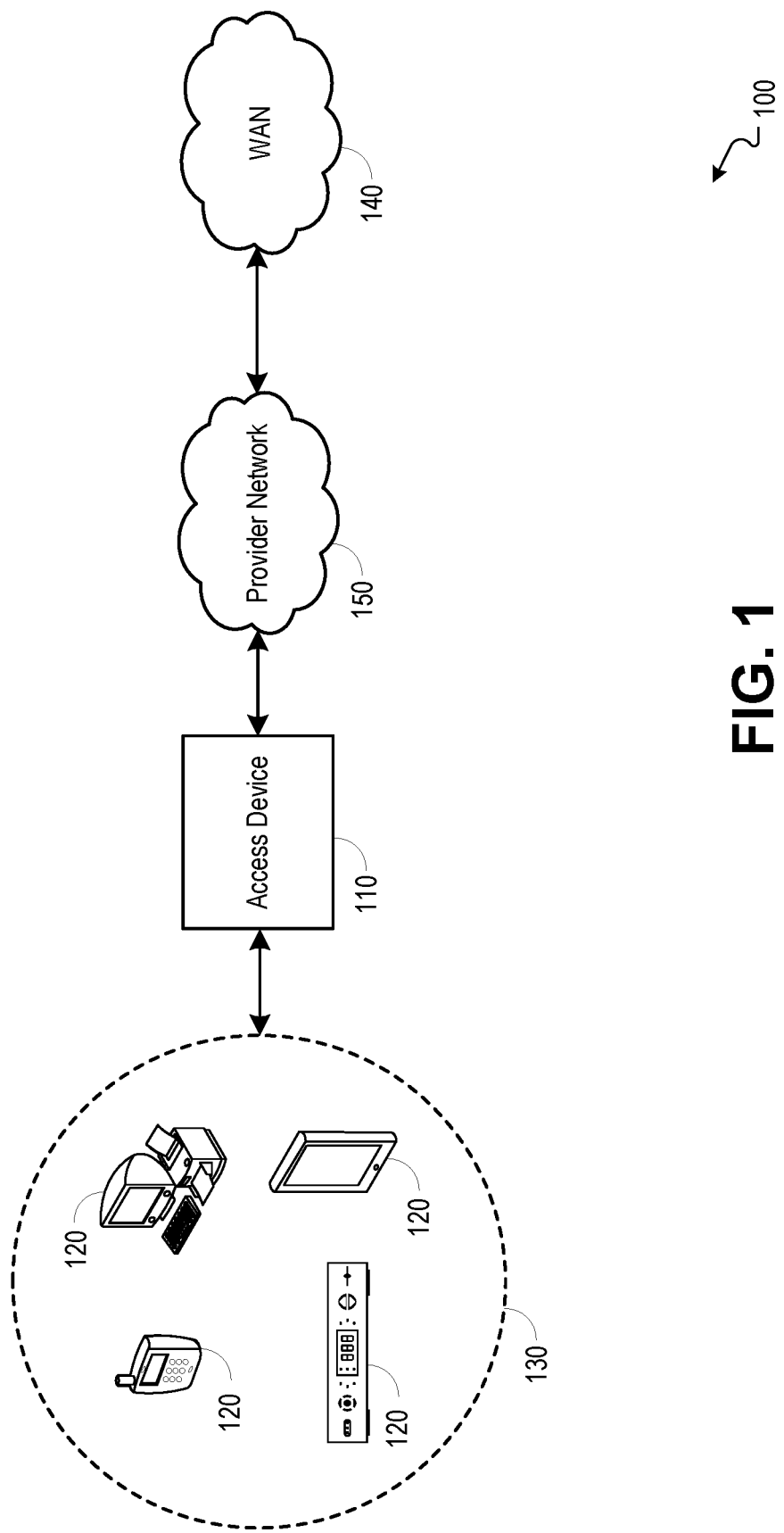
FIG. 1 is a block diagram illustrating an example network environment operable to facilitate the wireless transmission of network parameters for device configuration.

It is desirable to improve upon methods and systems for pairing wireless clients with an AP. Methods, systems, and computer readable media may facilitate pairing of a wireless client with an AP. In embodiments, a wireless device such as a bi-directional remote control unit (e.g., Bluetooth, or RF4CE (radio frequency for consumer electronics)) or other device configured to receive and transmit wireless communications may be used to download network parameters such as the WPS PIN/passphrase code from the AP and then use the same wireless device to download the network parameters including a target SSID, the PIN/Passphrase code, and/or other information from the wireless device to a client device. Once this operation is complete, the AP may stream one or more services to the client device. This process may be repeated for each client device within a subscriber premise, thereby allowing the user to retrieve the network parameters once, and use the wireless device to quickly program any/all client devices within the subscriber premise.

An embodiment of the invention described herein may include a method comprising: (a) receiving, at a wireless device, one or more network parameters, wherein the one or more network parameters are received from an access device within one or more wireless transmissions; (b) storing the one or more network parameters at the wireless device; (c) in response to an initiation of a network configuration operation at a client device, outputting the one or more network parameters from the wireless device to the client device, wherein the one or more network parameters are output within one or more wireless transmissions, and wherein the one or more network parameters facilitate a wireless pairing between the client device and the access device.

According to an embodiment of the invention, the wireless device comprises a bi-directional remote control unit.

According to an embodiment of the invention, the method described herein further comprises: (a) wherein, the one or more network parameters comprise a value designating a maximum number of devices for configuration with the one or more network parameters; (b) determining that the number of devices to which the one or more network parameters have been output from the wireless device is greater than the value designating the maximum number of devices for configuration with the one or more network parameters; and (c) deleting the one or more network parameters from the wireless device.

According to an embodiment of the invention, the method described herein further comprises: (a) wherein, the one or more network parameters comprise a value designating a maximum number of transmissions of the one or more network parameters from the wireless device; (b) determining that the number of times the one or more network parameters have been transmitted from the wireless device is greater than the value designating the maximum number of transmissions of the one or more network parameters from the wireless device; and (c) deleting the one or more network parameters from the wireless device.

According to an embodiment of the invention, the method described herein further comprises: (a) wherein, the one or more network parameters comprise a parameter lifespan, the parameter lifespan designating a duration of time for which the one or more network parameters are to be stored at the wireless device; (b) determining that the parameter lifespan has expired; and (c) deleting the one or more network parameters from the wireless device.

According to an embodiment of the invention, the one or more wireless transmissions carrying the one or more network parameters from the access device to the wireless device comprise one or more Bluetooth or Radio Frequency for Consumer Electronics transmissions.

According to an embodiment of the invention, the wireless device is notified of the initiation of the network configuration at the client device by a wireless communication received from the client device.

An embodiment of the invention described herein may include a wireless device comprising: (a) an interface configured to be used to receive one or more network parameters, wherein the one or more network parameters are received from an access device within one or more wireless transmissions; (b) storage configured to store the one or more network parameters; and (c) wherein the interface is further configured to be used to output, in response to an initiation of a network configuration at a client device, the one or more network parameters to the client device, wherein the one or more network parameters are output within one or more wireless transmissions, and wherein the one or more network parameters facilitate a wireless pairing between the client device and the access device.

According to an embodiment of the invention, the wireless device further comprises: (a) wherein, the one or more network parameters comprise a value designating a maximum number of devices for configuration with the one or more network parameters; (b) a module configured to determine that the number of devices to which the one or more network parameters have been output from the wireless device is greater than the value designating the maximum number of devices for configuration with the one or more network parameters; and (c) wherein the storage is further configured to delete the one or more network parameters.

According to an embodiment of the invention, the wireless device further comprises: (a) wherein, the one or more network parameters comprise a value designating a maximum number of transmissions of the one or more network parameters from the wireless device; (b) a module configured to determine that the number of times the one or more network parameters have been transmitted from the wireless device is greater than the value designating the maximum number of transmissions of the one or more network parameters from the wireless device; and (c) wherein, the storage is further configured to delete the one or more network parameters.

According to an embodiment of the invention, the wireless device further comprises: (a) wherein, the one or more network parameters comprise a parameter lifespan, the parameter lifespan designating a duration of time for which the one or more network parameters are to be stored at the storage; (b) a module configured to determine that the parameter lifespan has expired; and (c) wherein, the storage is further configured to delete the one or more network parameters.

An embodiment of the invention described herein may include one or more non-transitory computer readable media having instructions operable to cause one or more processors to perform the operations comprising: (a) receiving, at a wireless device, one or more network parameters, wherein the one or more network parameters are received from an access device within one or more wireless transmissions; (b) storing the one or more network parameters at the wireless device; (c) in response to an initiation of a network configuration at a client device, outputting the one or more network parameters from the wireless device to the client device, wherein the one or more network parameters are output within one or more wireless transmissions, and wherein the one or more network parameters facilitate a wireless pairing between the client device and the access device.

According to an embodiment of the invention, the instructions are further operable to cause one or more processors to perform the operations comprising: (a) wherein, the one or more network parameters comprise a value designating a maximum number of devices for configuration with the one or more network parameters; (b) determining that the number of devices to which the one or more network parameters have been output from the wireless device is greater than the value designating the maximum number of devices for configuration with the one or more network parameters; and (c) deleting the one or more network parameters from the wireless device.

According to an embodiment of the invention, the instructions are further operable to cause one or more processors to perform the operations comprising: (a) wherein, the one or more network parameters comprise a value designating a maximum number of transmissions of the one or more network parameters from the wireless device; (b) determining that the number of times the one or more network parameters have been transmitted from the wireless device is greater than the value designating the maximum number of transmissions of the one or more network parameters from the wireless device; and (c) deleting the one or more network parameters from the wireless device.

According to an embodiment of the invention, the instructions are further operable to cause one or more processors to perform the operations comprising: (a) wherein, the one or more network parameters comprise a parameter lifespan, the parameter lifespan designating a duration of time for which the one or more network parameters are to be stored at the wireless device; (b) determining that the parameter lifespan has expired; and (c) deleting the one or more network parameters from the wireless device.

FIG. 1 is a block diagram illustrating an example network environment 100 operable to facilitate the wireless transmission of network parameters for device configuration. In embodiments, an access device 110 may be configured to provide one or more services to one or more client devices 120, the one or more services including video or multimedia services, data services, voice services, and/or others. The access device 110 may include a multimedia or residential gateway, a set-top box (STB), an access point, a network extender, or any other device configured to deliver one or more services to one or more client devices 120. Client devices 120 may include televisions, computers, tablets, mobile devices, STBs, game consoles, and any other device configured to receive a service from an access device.

In embodiments, services may be delivered from the access device 110 to one or more client devices 120 over a local network 130 (e.g., a local area network (LAN), a wireless local area network (WLAN), a personal area network (PAN), etc.). The access device 110 may receive services from and may communicate with an upstream wide area network (WAN) 140 through a connection to a provider network 150. It should be understood that the access device 110 may operate as an access point to wirelessly deliver one or more services to one or more client devices 120 that are associated with (e.g., paired with or authenticated with) the access device 110 as stations. For example, the one or more client devices 120 may be configured with network parameters (e.g., network name, service set identifier (SSID), wireless channel, network PIN/password/passphrase/passcode, etc.) associated with a wireless network provided by the access device 110, thereby allowing the client devices 120 and the access device 110 to communicate with each other. It should be understood that various protocols and/or standards (e.g., Wi-Fi, multimedia over coax alliance (MoCA), ZigBee, etc.) may be used to deliver communications between an access device 110 and client device 120.

A wireless connection between the station 110 and access point 120 may be established through a protected setup sequence (e.g., WPS). The protected setup sequence may include the steps of scanning multiple wireless channels for an available access point, exchanging one or more messages between a station and access point, exchanging key messages (e.g., pre-shared key (PSK)) between the station and access point, and installing a key (e.g., PSK) at the station.

In embodiments, a pairing process may begin when a user (e.g., installer, subscriber, etc.) starts a WPS operation on an access device 110. When the WPS operation is initiated, network parameters (e.g., network name, service set identifier (SSID), wireless channel, network password/passphrase/passcode, WPS PIN, etc.) may be downloaded from the access device 110 to a wireless device, and the network parameters may be stored temporarily on the wireless device. As an example, the WPS operation may be initiated through a user interface associated with the access device 110. In embodiments, the wireless device may include a bi-directional remote control unit (RCU) (e.g., Bluetooth/RF4CE device) or any other device capable of receiving and transmitting wireless communications (e.g., short range wireless signals such as Bluetooth or RF4CE transmission). For example, the wireless device may be an RCU, a computer, a mobile device, a tablet, or other device that may be carried from the access device 110 to a client device 120.

The user may then take the wireless device to a client device 120 and select a WPS operation in a user interface (e.g., user interface of the client device 120, the wireless device, etc.). The client device 120 may then communicate with the wireless device, indicating that the wireless device may begin a process of outputting the network parameters to the client device 120. The wireless device may then output the network parameters to the client device 120.

Once the network parameters are downloaded to the client device 120, the access device 110 and the client device 120 may associate (e.g., pair, authenticate, etc.) with each other, and the access device 110 may begin communicating wirelessly and/or delivering wireless services to the client device 120. It should be understood that the network parameters stored at the wireless device may be output to one or more other client devices 120 (e.g., other client devices 120 within the subscriber premise).

For security purposes, the network parameters stored at the wireless device may be deleted after a specified period of time (e.g., a parameter lifespan). As an example, since the user may need to pair a plurality of client devices 120 with the access device 110, the timeout period may be up to sixty (60) minutes. Should the user wish to continue pairing client devices 120 after the expiration of the parameter lifespan, the user may return to the access device 110 to download the network parameters again. In embodiments, the network parameters may be limited to a predetermined number of transactions (e.g., may be used in the pairing of up to a predetermined number of devices). After the network parameters stored at the wireless device are output to the predetermined number of devices or are otherwise output from the wireless device a predetermined number of times, the network parameters may be deleted from the wireless device.

Figure 2:
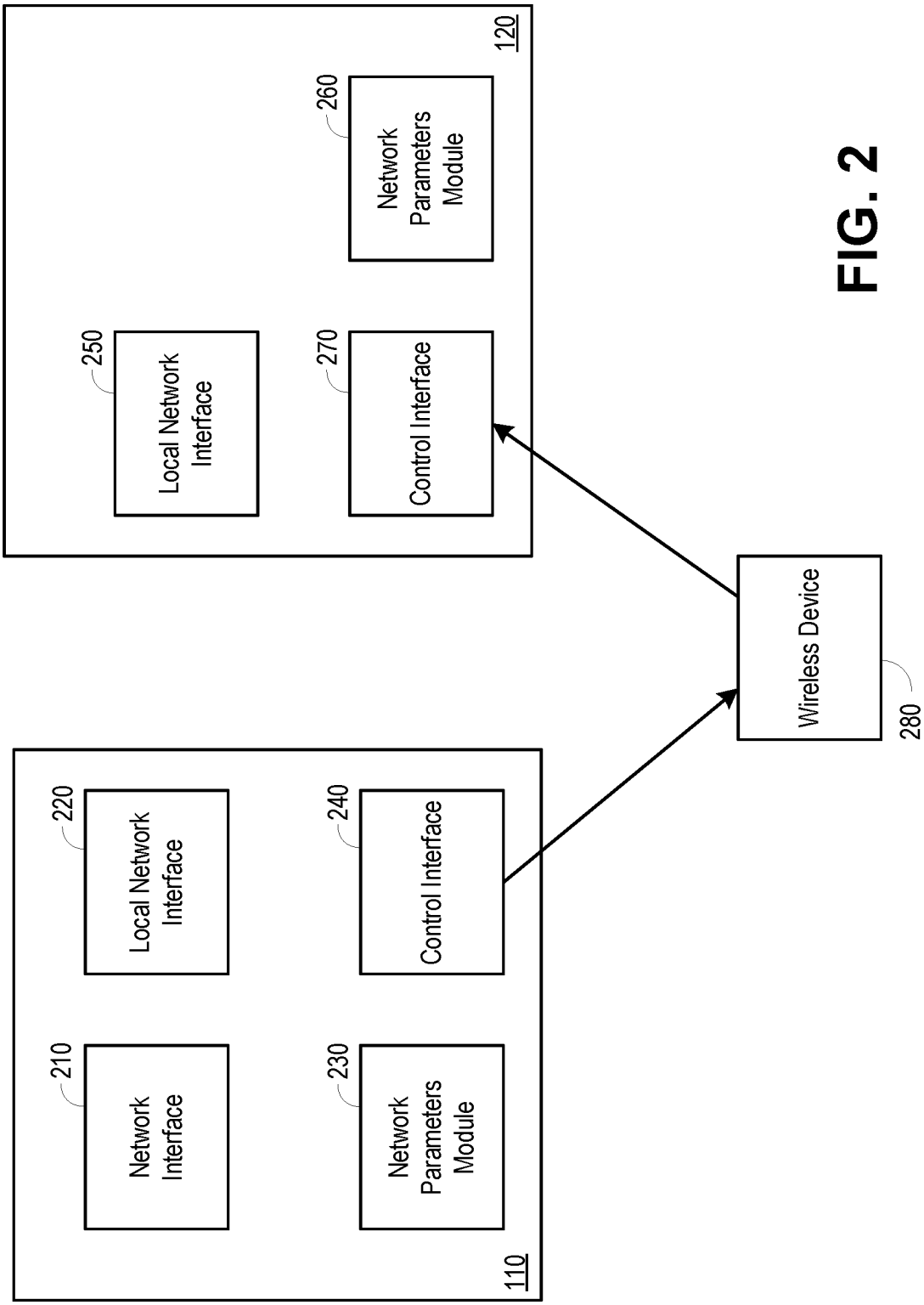
FIG. 2 is a block diagram illustrating an example access device and client device operable to facilitate the wireless transmission of network parameters for configuration of the client device.

FIG. 2 is a block diagram illustrating an example access device 110 and client device 120 operable to facilitate the wireless transmission of network parameters for configuration of the client device 120. In embodiments, the access device 110 may include a network interface 210, a local network interface 220, a network parameters module 230, and a control interface 240. In embodiments, the client device 120 may include a local network interface 250, a network parameters module 260, and a control interface 270.

In embodiments, a pairing process may begin when a user (e.g., installer, subscriber, etc.) starts a WPS operation on the access device 110. When the WPS operation is initiated, network parameters (e.g., network name, service set identifier (SSID), wireless channel, network password/passphrase/passcode, WPS PIN, etc.) may be retrieved from the network parameters module 230 and downloaded from the access device 110 to a wireless device 280 (e.g., a bi-directional RCU such as a Bluetooth/RF4CE device or any other device capable of receiving and transmitting wireless communications), and the network parameters may be stored temporarily on the wireless device 280. The network parameters may be output to the wireless device 280 as one or more wireless signals output through the control interface 240.

The user may then take the wireless device 280 to a client device 120 and select a WPS operation in a user interface (e.g., user interface of the client device 120, the wireless device 280, etc.). The client device 120 may then communicate with the wireless device 280 (e.g., through the control interface 270), indicating that the wireless device 280 may begin a process of outputting the network parameters to the client device 120. The wireless device 280 may then output the network parameters to the client device 120, and the network parameters may be stored at the client device 120 at the network parameters module 260.

Once the network parameters are downloaded to the client device 120, the access device 110 and the client device 120 may associate (e.g., pair, authenticate, etc.) with each other, and the access device 110 may begin communicating wirelessly and/or delivering wireless services (e.g., services received through the network interface 210) to the client device 120. Communications between the two devices may be passed between the local network interface 220 of the access device 110 and the local network interface 250 of the client device 120. The local network interface 220 and local network interface 250 may be configured to output and receive wireless signals and support various wireless communication protocols and standards.

Figure 3:
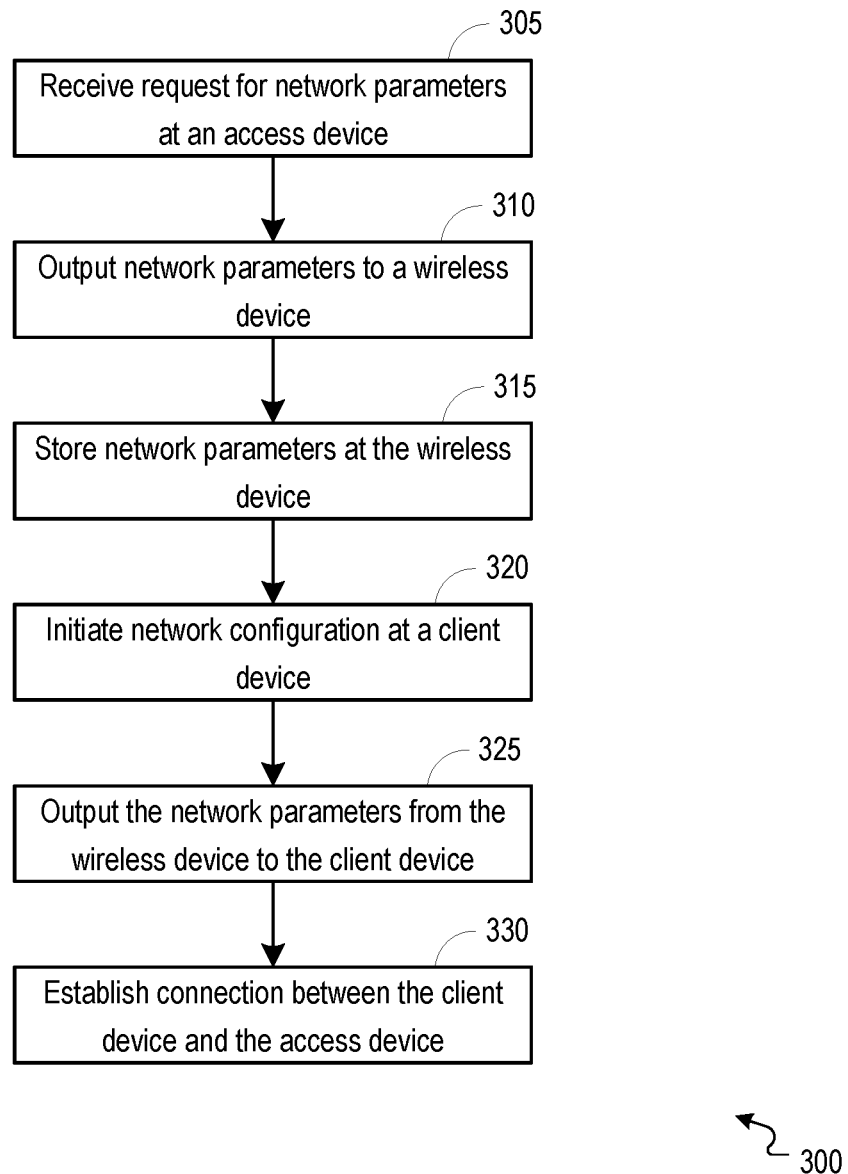
FIG. 3 is a flowchart illustrating an example process operable to facilitate the wireless transmission of network parameters for device configuration.

FIG. 3 is a flowchart illustrating an example process 300 operable to facilitate the wireless transmission of network parameters for device configuration. The process 300 can begin at 305 when a request for network parameters is received at an access device. For example, the request for network parameters may be received at an access device 110 of FIG. 1 (e.g., through a control interface 240 of FIG. 2) and may be recognized by a network parameters module 230 of FIG. 2. In embodiments, the request for the network parameters may be received from a wireless device (e.g., wireless device 280 of FIG. 2). For example, the request may be transmitted from the wireless device as a wireless signal (e.g., radio frequency (RF), infrared (IR), etc.), and the request may include a command for initiating a WPS (Wi-Fi protected setup) operation, identification information associated with the wireless device 280, and/or other information facilitating the delivery of network parameters to the wireless device 280. The wireless device 280 may be a bi-directional RCU such as a Bluetooth, Zigbee, or RF4CE (radio frequency for consumer electronics) device, or may be any other device configured to receive and transmit wireless communications.

At 310, network parameters may be output to a wireless device. For example, the received request for network parameters may initiate a WPS (Wi-Fi protected setup) operation at the access device 110, and in response to the request, the access device 110 (e.g., the network parameters module 230) may output network parameters to the wireless device (e.g., wireless device 280) through the control interface 240. In embodiments, the network parameters may include a network name, service set identifier (SSID), wireless channel, network password/passphrase/passcode, WPS PIN (personal identification number), and/or other parameters associated with a wireless network provided by the access device 110. The network parameters may be output from the access device 110 to the wireless device 280 as one or more wireless transmissions or signals (e.g., RF signal). The wireless device 280 may be a bi-directional RCU or other wireless device and may recognize and accept one or more wireless signals carrying the network parameters from the access device 110.

At 315, the network parameters may be stored at the wireless device. For example, the wireless device (e.g., wireless device 280) may include storage and the network parameters may be stored within the storage of the wireless device.

At 320, a network configuration operation may be initiated at a client device. For example, the network configuration operation may be a WPS operation initiated at a client device 120 of FIG. 1. The WPS operation may be initiated through a user interface presented at a display device via the client device 120, in response to receiving a command from the wireless device, or may be otherwise initiated by a user.

At 325, the network parameters may be output from the wireless device to the client device. In embodiments, when the WPS operation is initiated at the client device (e.g., client device 120), the client device may output a communication to the wireless device requesting the network parameters from the wireless device. For example, the communication may be a wireless signal output from the control interface 270 of FIG. 2 and may include a request for a delivery of the network parameters. In response to the request for the network parameters, the wireless device (e.g., wireless device 280) may output a wireless signal carrying the network parameters to the client device.

At 330, a connection between the client device and the access device may be established. For example, the client device may store the network parameters (e.g., at a network parameters module 260 of FIG. 2) and may use the network parameters to associate (e.g., pair or authenticate) with the access device. Once the connection between the client device and the access device is established, the access device may begin to wirelessly communicate and provide wireless services to the client device.

Figure 4:
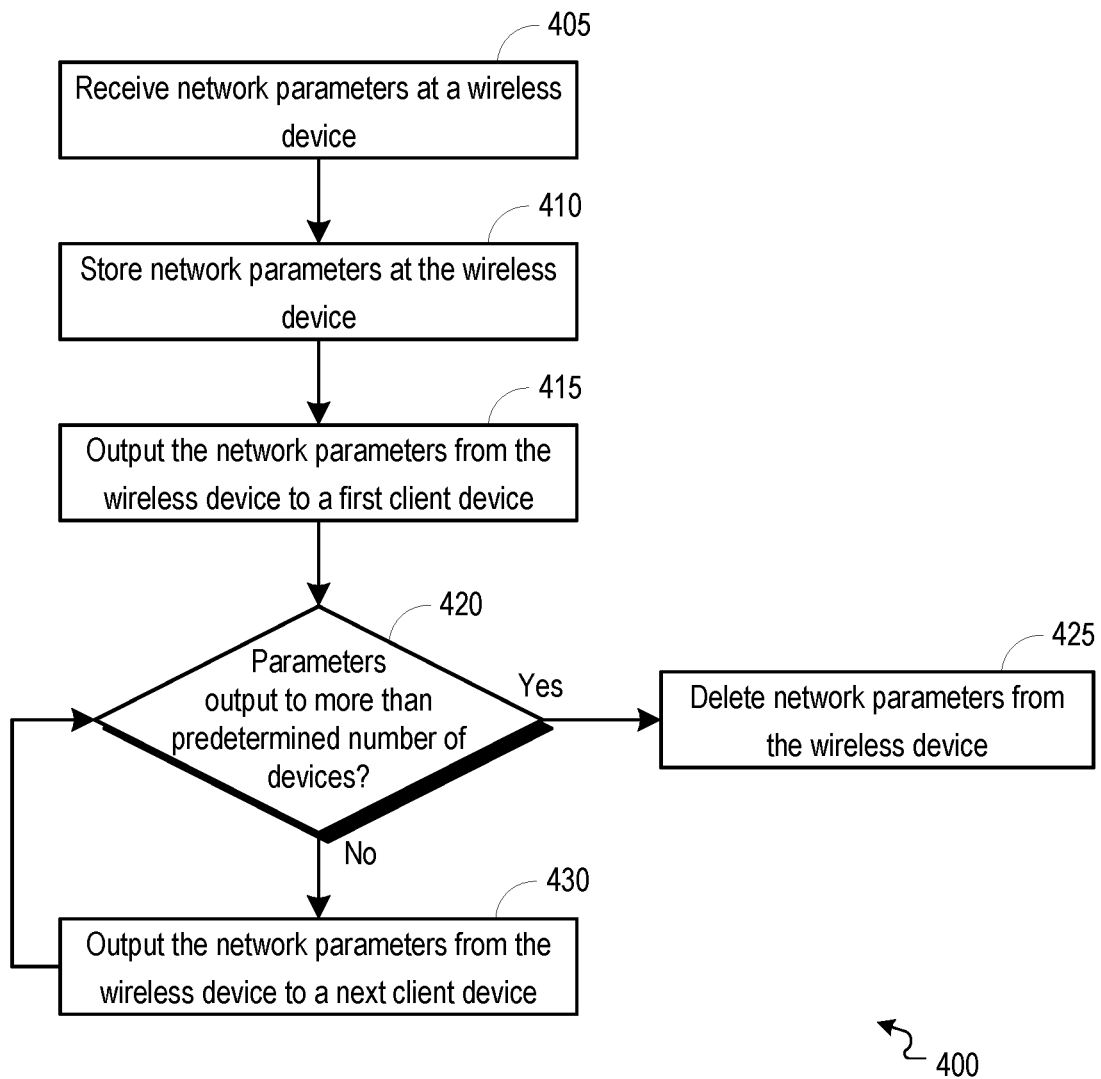
FIG. 4 is a flowchart illustrating an example process operable to facilitate the wireless transmission of network parameters for the configuration of a predetermined number of devices.

FIG. 4 is a flowchart illustrating an example process 400 operable to facilitate the wireless transmission of network parameters for the configuration of a predetermined number of devices. The process 400 can begin at 405 when network parameters are received at a wireless device (e.g., remote control unit (RCU) or other device configured to receive and transmit wireless communications). For example, the network parameters may be received at the wireless device (e.g., wireless device 280 of FIG. 2) in response to a WPS (Wi-Fi protected setup) operation being initiated at an access device 110 of FIG. 1. In embodiments, the network parameters may include a network name, service set identifier (SSID), wireless channel, network password/passphrase/passcode, WPS PIN (personal identification number), and/or other parameters associated with a wireless network provided by the access device 110. The network parameters may be received at the wireless device 280 from the access device 110 as one or more wireless signals (e.g., RF signal). The wireless device 280 may be a bi-directional RCU (e.g., Bluetooth, Zigbee, RF4CE, etc.) or other type of wireless device and may recognize and accept one or more wireless signals carrying the network parameters from the access device 110.

At 410, the network parameters may be stored at the wireless device. For example, the wireless device (e.g., wireless device 280) may include storage and the network parameters may be stored within the storage of the wireless device.

At 415, the network parameters may be output from the wireless device to a first client device. In embodiments, the network parameters may be output from the wireless device in response to receiving a communication from the first client device, the communication requesting the network parameters from the wireless device. In response to the request for the network parameters, the wireless device (e.g., wireless device 280) may output a wireless signal carrying the network parameters to the client device. The client device (e.g., client device 120 of FIG. 1) may receive the signal(s) carrying the network parameters through a control interface 270 of FIG. 2 and may store the network parameters at a network parameters module 260 of FIG. 2.

At 420, a determination may be made whether the network parameters have been output to more than a predetermined number of client devices. The determination whether the network parameters have been output to more than a predetermined number of client devices may be made, for example, by the wireless device 280. In embodiments, a threshold number of devices for configuration with the network parameters may be downloaded to the wireless device 280 along with the network parameters. The threshold number of devices may be a maximum number of devices for configuration via the network parameters or may be a maximum number of transmissions of the network parameters from the wireless device 280. The predetermined threshold may control how may devices may be configured using the network parameters. With each configuration of a device through the transmission of the network parameters to the device from the wireless device 280, a count of the number of configured devices may be incremented at the wireless device 280, and this count may be the value that is compared to the predetermined threshold at 420. The number of devices that have been configured via a transmission of the network parameters from the wireless device 280 may include only those devices that have been successfully configured via a transmission of the network parameters from the wireless device 280. For example, a failed configuration of a device after the network parameters are transmitted to the device from the wireless device 280 may not cause the count of devices to which the parameters have been output to increment.

If, at 420, the determination is made that the network parameters have been output by the wireless device 280 to more client devices than the predetermined threshold number of devices, the process 400 may proceed to 425. At 425, the network parameters may be deleted from the wireless device 280. For example, the wireless device 280 may delete the network parameters from storage associated with the wireless device 280. In embodiments, the wireless device 280 may output a notification indicating that the predetermined threshold number of devices has been reached. For example, a light-emitting diode (LED) of the wireless device 280 may flash, or a notification window may be presented at a display of the wireless device 280 or display associated with a client device 120 to inform a user (e.g., subscriber, installer, technician, etc.) that the network parameters will be or have been deleted from the wireless device 280 as a result of the maximum number of configured devices being reached.

If, at 420, the determination is made that the network parameters have not been output by the wireless device 280 to more client devices than the predetermined threshold number of devices, the process 400 may proceed to 430. At 430, the network parameters may be output from the wireless device to a next client device. For example, the network parameters may be output from the wireless device to a next client device when a request for the network parameters is received at the wireless device from the next client device. After outputting the network parameters to the next client device, the process 400 may return to 420.

Figure 5:
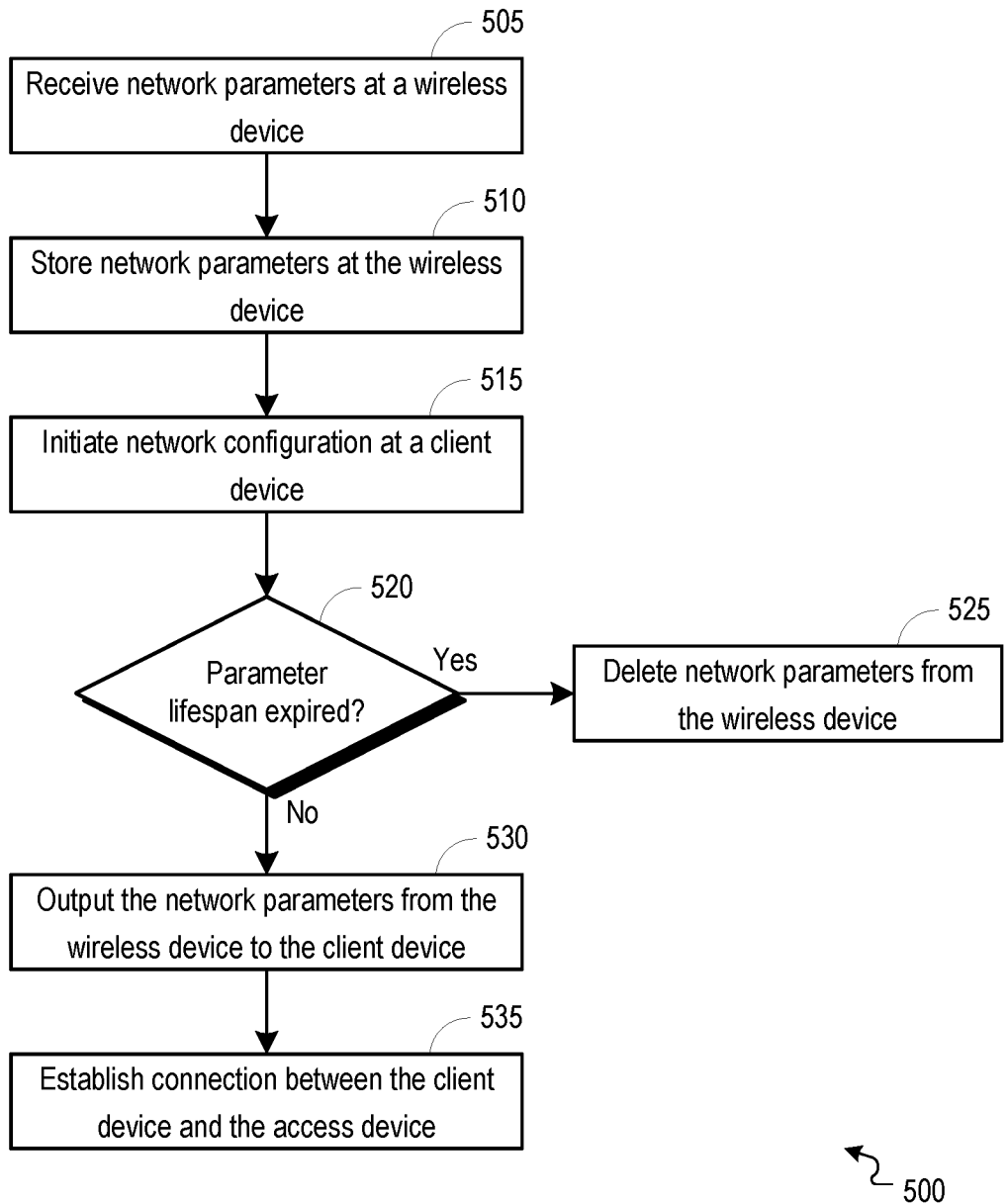
FIG. 5 is a flowchart illustrating an example process operable to facilitate the wireless transmission of network parameters for device configuration over a predetermined duration of time.

FIG. 5 is a flowchart illustrating an example process 500 operable to facilitate the wireless transmission of network parameters for device configuration over a predetermined duration of time. The process 500 can begin at 505 when network parameters are received at a wireless device. For example, the network parameters may be received at the wireless device (e.g., wireless device 280 of FIG. 2) in response to a WPS (Wi-Fi protected setup) operation being initiated at an access device 110 of FIG. 1. In embodiments, the network parameters may include a network name, service set identifier (SSID), wireless channel, network password/passphrase/passcode, WPS PIN (personal identification number), and/or other parameters associated with a wireless network provided by the access device 110. The network parameters may be received at the wireless device 280 from the access device 110 as one or more wireless signals (e.g., RF signal). The wireless device 280 may be a bi-directional RCU (e.g., Bluetooth, Zigbee, RF4CE, etc.) or any other device configured to receive and transmit wireless communications, and the wireless device 280 may recognize and accept one or more wireless signals carrying the network parameters from the access device 110.

At 510, the network parameters may be stored at the wireless device. For example, the wireless device (e.g., wireless device 280) may include storage and the network parameters may be stored within the storage of the wireless device.

At 515, a network configuration operation may be initiated at a client device. For example, the network configuration operation may be a WPS operation initiated at a client device 120 of FIG. 1. The WPS operation may be initiated in response to receiving a command from the wireless device or may be otherwise initiated by a user.

At 520, a determination may be made whether a parameter lifespan associated with the network parameters has expired. The determination whether the parameter lifespan has expired may be made, for example, by the wireless device 280. In embodiments, a parameter lifespan may be identified by the wireless device 280 from the network parameters that were received from the access device. When the network parameters are received by the wireless device 280, the wireless device 280 may initiate a timer set for a duration equivalent to the parameter lifespan.

If, at 520, the determination is made that the parameter lifespan has expired, the process 500 may proceed to 525. At 525, the network parameters may be deleted from the wireless device 280. For example, the wireless device 280 may delete the network parameters from storage associated with the wireless device 280. In embodiments, the wireless device 280 may output a notification indicating that the parameter lifespan has expired. For example, a light-emitting diode (LED) of the wireless device 280 may flash, or a notification window may be presented at a display of the wireless device 280 or display associated with a client device 120 to inform a user (e.g., subscriber, installer, technician, etc.) that the network parameters will be or have been deleted from the wireless device 280 as a result of the expiration of the parameter lifespan.

If, at 520, the determination is made that the parameter lifespan has not expired, the process 500 may proceed to 530. At 530, the network parameters may be output from the wireless device to the client device. In embodiments, when the WPS operation is initiated at the client device (e.g., client device 120), the client device may output a communication to the wireless device requesting the network parameters from the wireless device. For example, the communication may be a wireless signal output from the control interface 270 of FIG. 2 and may include a request for a delivery of the network parameters. In response to the request for the network parameters, the wireless device (e.g., wireless device 280) may output a wireless signal carrying the network parameters to the client device.

At 535, a connection between the client device and the access device may be established. For example, the client device may store the network parameters (e.g., at a network parameters module 260 of FIG. 2) and may use the network parameters to associate (e.g., pair or authenticate) with the access device. Once the connection between the client device and the access device is established, the access device may begin to wirelessly communicate and provide wireless services to the client device.

Figure 6:
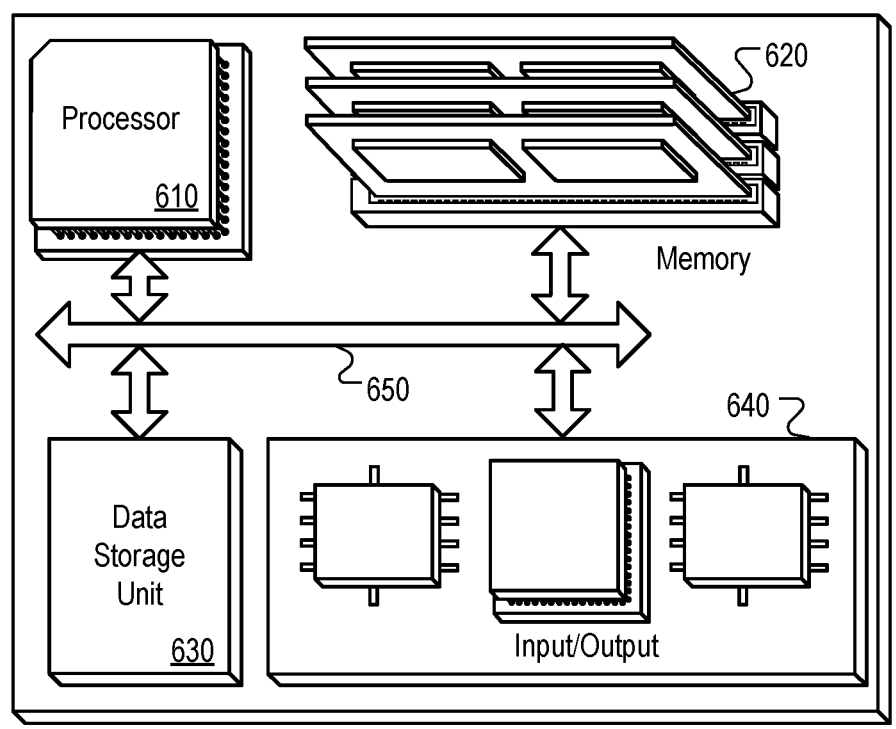
FIG. 6 is a block diagram of a hardware configuration operable to facilitate the wireless transmission of network parameters for device configuration.

FIG. 6 is a block diagram of a hardware configuration 600 operable to facilitate the wireless transmission of network parameters for device configuration. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to an access device (e.g., access device 110 of FIG. 1), a client device (e.g., client device 120 of FIG. 1), and/or a wireless device (e.g., wireless device 280 of FIG. 2). In embodiments, the input/output device can include driver devices configured to send communications to, and receive communications from one or more networks (e.g., WAN 140 of FIG. 1, provider network 150 of FIG. 1, local network 130 of FIG. 1, etc.).

Those skilled in the art will appreciate that the invention improves upon methods and systems for pairing a device with an AP. Methods, systems, and computer readable media may facilitate pairing of a wireless client with an AP. In embodiments, a wireless device such as a bi-directional remote control unit (e.g., Bluetooth, or RF4CE (radio frequency for consumer electronics)) or other device configured to receive and transmit wireless communications may be used to download network parameters such as the WPS PIN/passphrase code from the AP and then use the same wireless device to download the network parameters including a target SSID, the PIN/Passphrase code, and/or other information from the wireless device to a client device. Once this operation is complete, the AP may stream one or more services to the client device. This process may be repeated for each client device within a subscriber premise, thereby allowing the user to retrieve the network parameters once, and use the wireless device to quickly program any/all client devices within the subscriber premise.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    outputting, from a wireless device, a first request for one or more network parameters associated with a local network that is provided by an access device, wherein the access device delivers one or more services to one or more client devices over the local network;
    receiving, at the wireless device, the one or more network parameters, wherein the one or more network parameters are retrieved from one or more wireless transmissions that are received from the access device, the one or more wireless transmissions being output from the access device in response to the first request for the one or more network parameters being received at the access device;
    storing the one or more network parameters at the wireless device;
    receiving, at the wireless device, a second request for the one or more network parameters, wherein the second request is output from a client device in response to an initiation of a network configuration operation at the client device;
    in response to receiving, from the client device, the second request for the one or more network parameters, outputting the one or more network parameters from the wireless device to the client device, wherein the one or more network parameters are output within one or more wireless transmissions, and wherein the one or more network parameters facilitate a wireless pairing between the client device and the access device.

2. The method of claim 1, wherein the wireless device comprises a bi-directional remote control unit.

3. The method of claim 1, further comprising:
    wherein, the one or more network parameters comprise a value designating a maximum number of devices for configuration with the one or more network parameters;
    determining that the number of devices to which the one or more network parameters have been output from the wireless device is greater than the value designating the maximum number of devices for configuration with the one or more network parameters; and
    deleting the one or more network parameters from the wireless device.

4. The method of claim 1, further comprising:
    wherein, the one or more network parameters comprise a value designating a maximum number of transmissions of the one or more network parameters from the wireless device;
    determining that the number of times the one or more network parameters have been transmitted from the wireless device is greater than the value designating the maximum number of transmissions of the one or more network parameters from the wireless device; and
    deleting the one or more network parameters from the wireless device.

5. The method of claim 1, further comprising:
    wherein, the one or more network parameters comprise a parameter lifespan, the parameter lifespan designating a duration of time for which the one or more network parameters are to be stored at the wireless device;
    determining that the parameter lifespan has expired; and
    deleting the one or more network parameters from the wireless device.

6. The method of claim 1, wherein the one or more wireless transmissions carrying the one or more network parameters from the access device to the wireless device comprise one or more Bluetooth or Radio Frequency for Consumer Electronics transmissions.

7. The method of claim 1, wherein the wireless device is notified of the initiation of the network configuration at the client device by a wireless communication received from the client device.

8. A wireless device comprising:
    an interface configured to be used to output a first request for one or more network parameters associated with a local network that is provided by an access device and to receive the one or more network parameters, wherein the one or more network parameters are received from the access device within one or more wireless transmissions, the one or more wireless transmissions being output from the access device in response to the first request for the one or more network parameters being received at the access device, wherein the access device delivers one or more services to one or more client devices over the local network;
    storage configured to store the one or more network parameters; and
    wherein the interface is further configured to receive a second request for the one or more network parameters, wherein the second request is output from a client device in response to an initiation of a network configuration operation at the client device;
    wherein the interface is further configured to be used to output, in response to receiving, from the client device, the second request for the one or more network parameters, the one or more network parameters to the client device, wherein the one or more network parameters are output within one or more wireless transmissions, and wherein the one or more network parameters facilitate a wireless pairing between the client device and the access device.

9. The wireless device of claim 8, further comprising:
    wherein, the one or more network parameters comprise a value designating a maximum number of devices for configuration with the one or more network parameters;
    a module configured to determine that the number of devices to which the one or more network parameters have been output from the wireless device is greater than the value designating the maximum number of devices for configuration with the one or more network parameters; and
    wherein the storage is further configured to delete the one or more network parameters.

10. The wireless device of claim 8, further comprising:
    wherein, the one or more network parameters comprise a value designating a maximum number of transmissions of the one or more network parameters from the wireless device;
    a module configured to determine that the number of times the one or more network parameters have been transmitted from the wireless device is greater than the value designating the maximum number of transmissions of the one or more network parameters from the wireless device; and wherein, the storage is further configured to delete the one or more network parameters.

11. The wireless device of claim 8, further comprising:
wherein, the one or more network parameters comprise a parameter lifespan, the parameter lifespan designating a duration of time for which the one or more network parameters are to be stored at the storage;
a module configured to determine that the parameter lifespan has expired; and
wherein, the storage is further configured to delete the one or more network parameters.

12. The wireless device of claim 8, wherein the one or more wireless transmissions carrying the one or more network parameters from the access device to the interface comprise one or more Bluetooth or Radio Frequency for Consumer Electronics transmissions.

13. The wireless device of claim 8, wherein the wireless device is notified of the initiation of the network configuration at the client device by a wireless communication received at the interface from the client device.

14. One or more non-transitory computer readable media having instructions operable to cause one or more processors to perform the operations comprising:
outputting, from a wireless device, a first request for one or more network parameters associated with a local network that is provided by an access device, wherein the access device delivers one or more services to one or more client devices over the local network;
receiving, at the wireless device, the one or more network parameters, wherein the one or more network parameters are retrieved from one or more wireless transmissions that are received from the access device, the one or more wireless transmissions being output from the access device in response to the first request for the one or more network parameters being received at the access device;
storing the one or more network parameters at the wireless device;
receiving, at the wireless device, a second request for the one or more network parameters, wherein the second request is output from a client device in response to an initiation of a network configuration operation at the client device;
in response to receiving, from the client device, the second request for the one or more network parameters, outputting the one or more network parameters from the wireless device to the client device, wherein the one or more network parameters are output within one or more wireless transmissions, and wherein the one or more network parameters facilitate a wireless pairing between the client device and the access device.

15. The one or more non-transitory computer-readable media of claim 14, wherein the wireless device comprises a bi-directional remote control unit.

16. The one or more non-transitory computer-readable media of claim 14, wherein the instructions are further operable to cause one or more processors to perform the operations comprising:
wherein, the one or more network parameters comprise a value designating a maximum number of devices for configuration with the one or more network parameters;
determining that the number of devices to which the one or more network parameters have been output from the wireless device is greater than the value designating the maximum number of devices for configuration with the one or more network parameters; and
deleting the one or more network parameters from the wireless device.

17. The one or more non-transitory computer-readable media of claim 14, wherein the instructions are further operable to cause one or more processors to perform the operations comprising:
wherein, the one or more network parameters comprise a value designating a maximum number of transmissions of the one or more network parameters from the wireless device;
determining that the number of times the one or more network parameters have been transmitted from the wireless device is greater than the value designating the maximum number of transmissions of the one or more network parameters from the wireless device; and
deleting the one or more network parameters from the wireless device.

18. The one or more non-transitory computer-readable media of claim 14, wherein the instructions are further operable to cause one or more processors to perform the operations comprising:
wherein, the one or more network parameters comprise a parameter lifespan, the parameter lifespan designating a duration of time for which the one or more network parameters are to be stored at the wireless device;
determining that the parameter lifespan has expired; and
deleting the one or more network parameters from the wireless device.

19. The one or more non-transitory computer-readable media of claim 14, wherein the one or more wireless transmissions carrying the one or more network parameters from the access device to the wireless device comprise one or more Bluetooth or Radio Frequency for Consumer Electronics transmissions.

20. The one or more non-transitory computer-readable media of claim 14, wherein the wireless device is notified of the initiation of the network configuration at the client device by a wireless communication received from the client device.

* * * * *